(12) United States Patent
Arnault et al.

(10) Patent No.: US 6,612,749 B2
(45) Date of Patent: Sep. 2, 2003

(54) SELF-CENTRING CLUTCH BEARING DEVICE

(75) Inventors: Benoît Arnault, Saint-Cyr-sur-Loire (FR); Hervé Girardin, Joue-les-Tours (FR)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 10/051,302

(22) Filed: Jan. 22, 2002

(65) Prior Publication Data

US 2002/0097940 A1 Jul. 25, 2002

(30) Foreign Application Priority Data

Jan. 23, 2001 (FR) .............................. 01 00894

(51) Int. Cl.[7] .............................................. F16C 33/78
(52) U.S. Cl. ........................ 384/607; 384/611; 384/612; 384/615; 384/617
(58) Field of Search ................................. 384/607, 611, 384/612, 615, 617

(56) References Cited

U.S. PATENT DOCUMENTS

| 3,920,107 A | 11/1975 | Limbacher |
| 4,643,286 A | 2/1987 | Lassiaz |
| 4,852,710 A | 8/1989 | Gay et al. |
| 4,854,436 A | 8/1989 | Lassiaz et al. |

FOREIGN PATENT DOCUMENTS

| FR | 2 744 776 | 8/1997 |
| FR | 2 755 487 | 5/1998 |

*Primary Examiner*—Lenard A Footland
(74) *Attorney, Agent, or Firm*—Smith, Gambrell & Russell

(57) ABSTRACT

Clutch bearing device comprising an actuating element intended to be mounted on an operating element 2. The actuating element comprises a rolling bearing 1 provided with a rotating race 15 and with a non-rotating race 9, the said bearing 1 being able to be displaced radially with respect to the operating element 2 to self-align with the clutch diaphragm, the non-rotating race 9 comprising an inwardly-directed radial portion 13. The device comprises a means of axially securing the actuating element to the operating element 2. The device comprises a self-alignment member 21 centered on the non-rotating race 9 and provided with axially elastic elements 23.

14 Claims, 5 Drawing Sheets

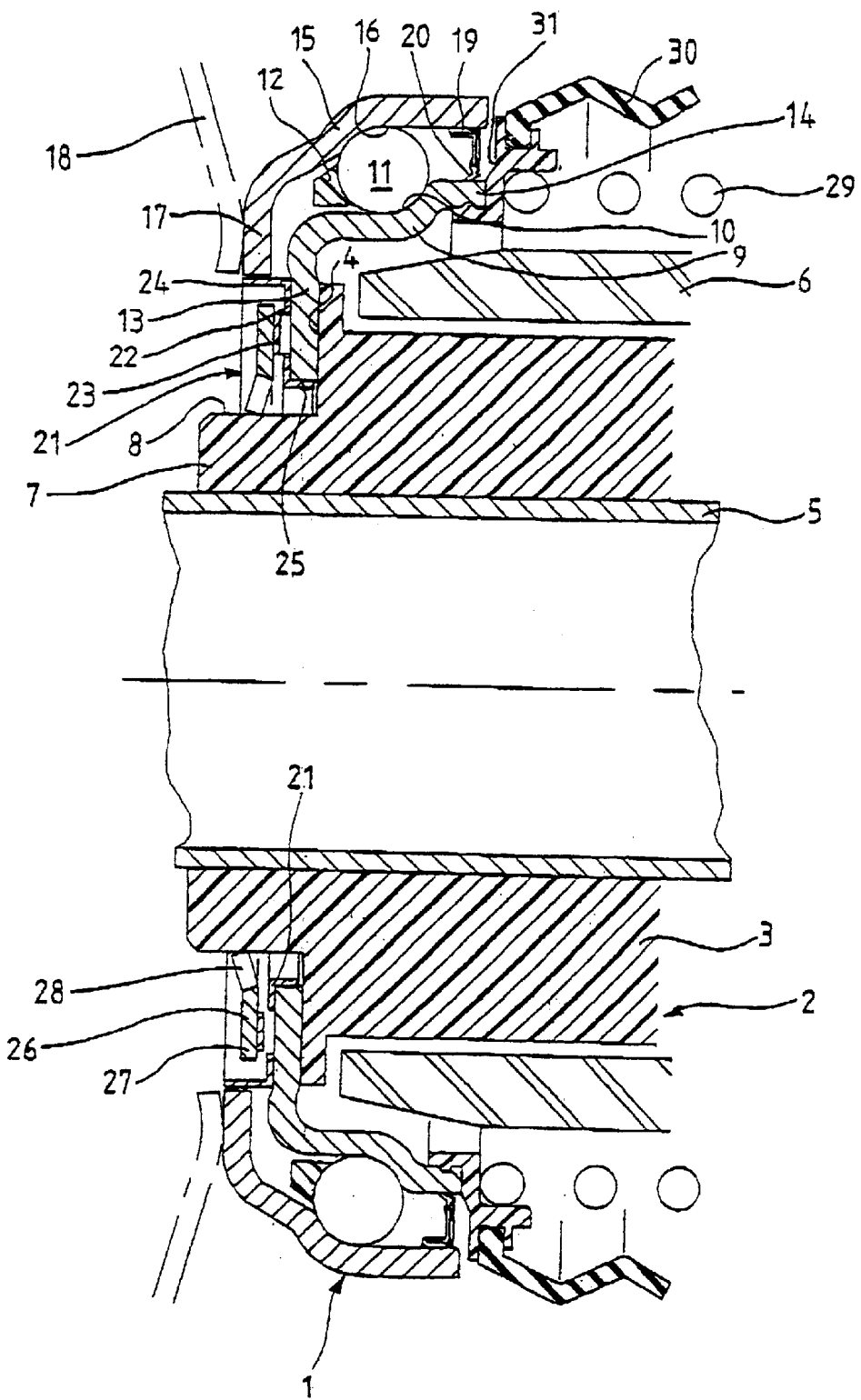
FIG_1

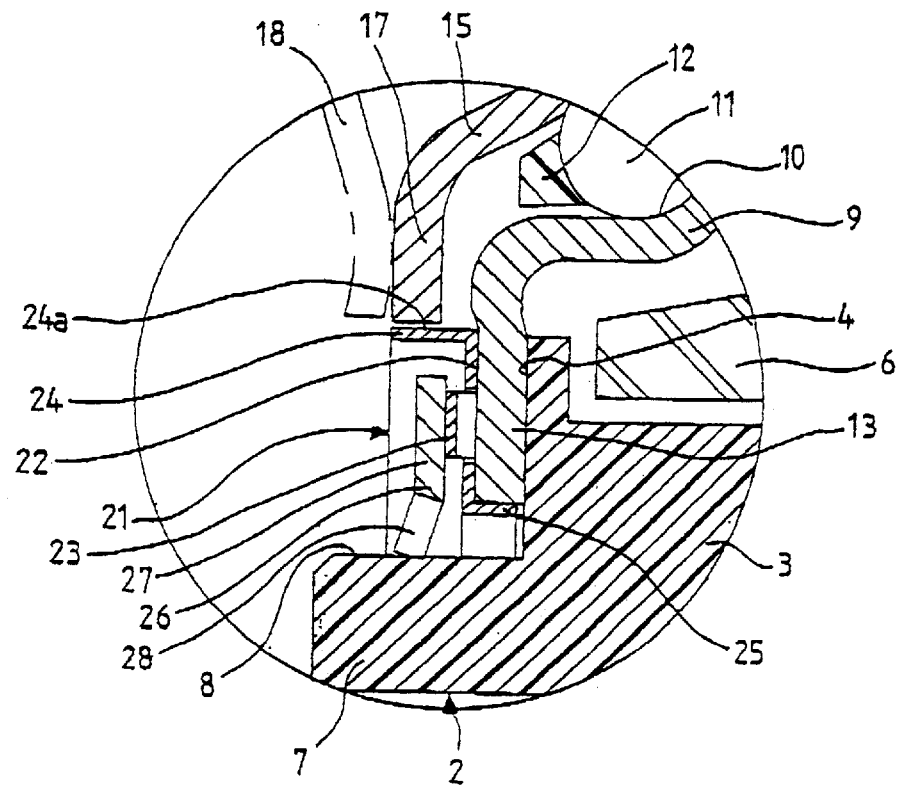
FIG_2
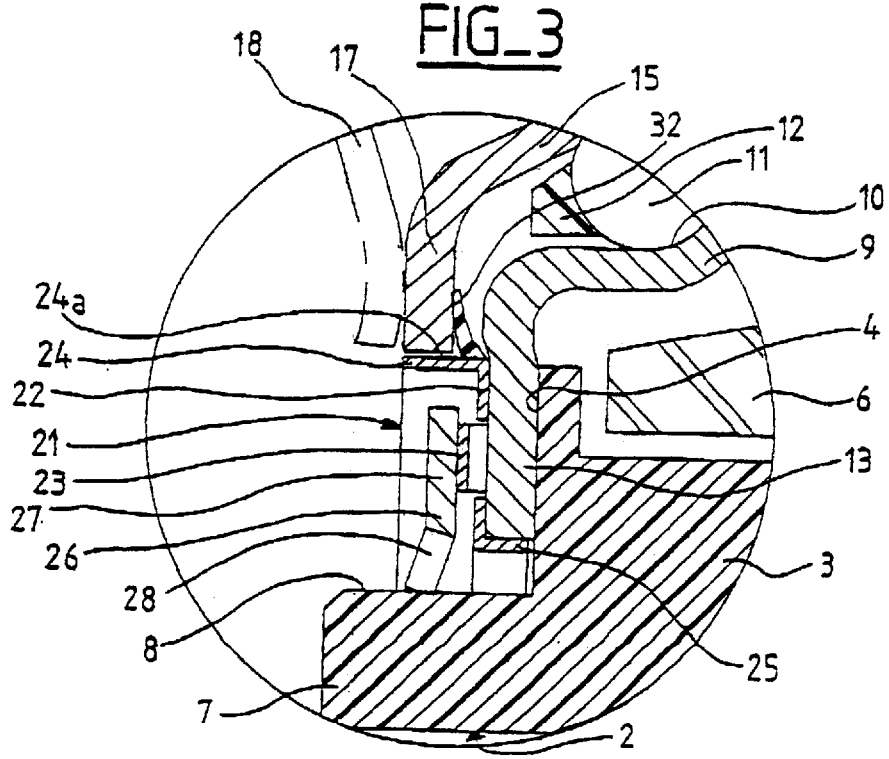
FIG_3

FIG_4
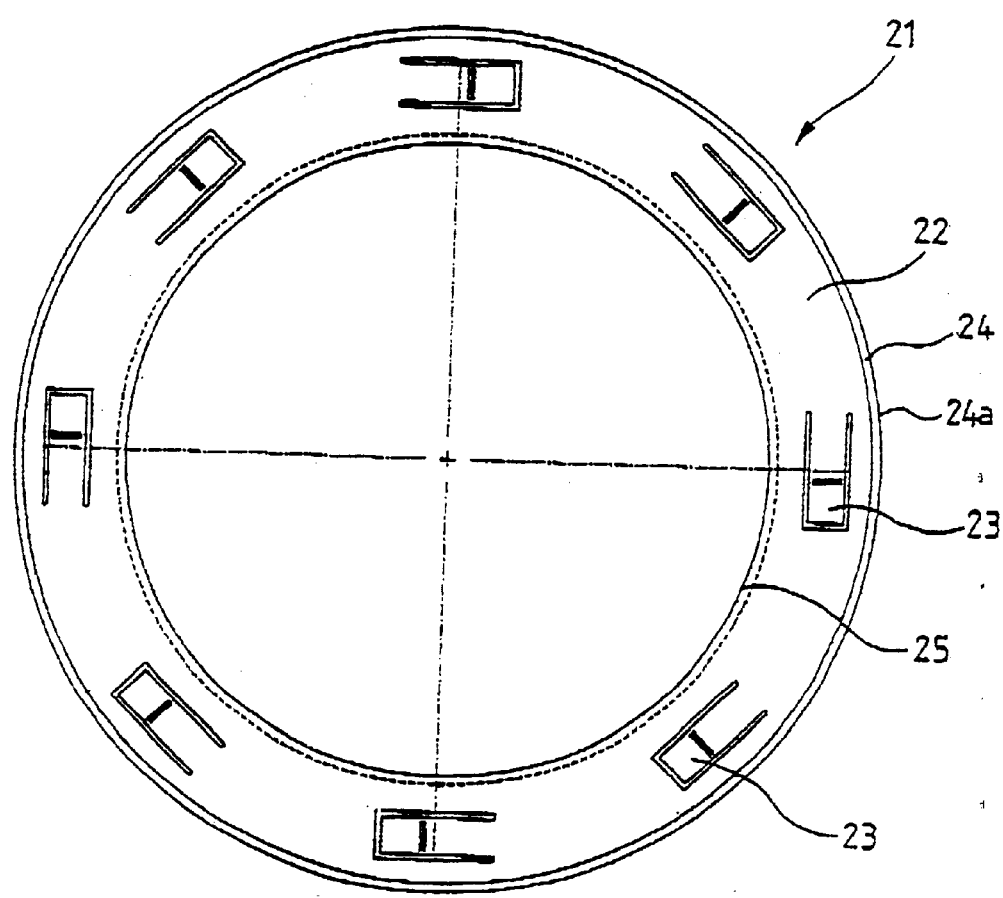

FIG_5
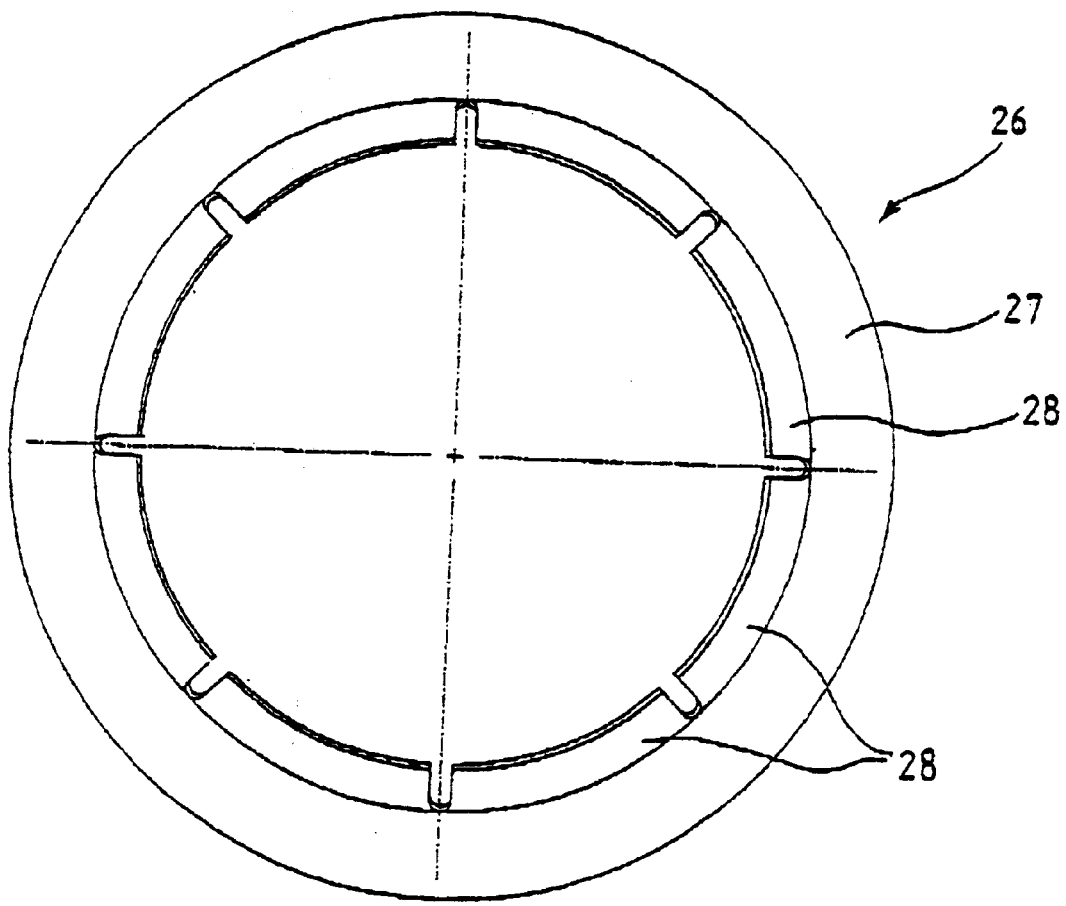

FIG_6
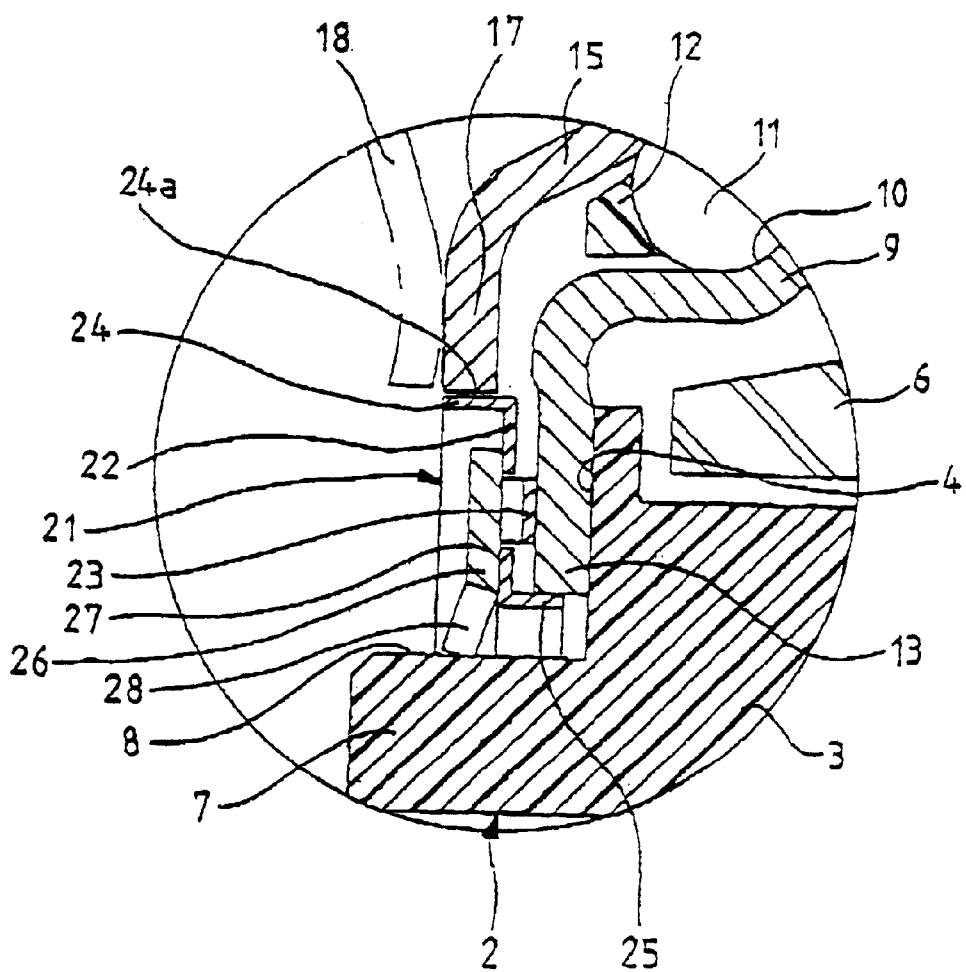

SELF-CENTRING CLUTCH BEARING DEVICE

The present invention is in the field of clutch bearings, of the type comprising a rolling bearing mounted on an operating member equipped with at least one cylindrical part. The operating member is actuated mechanically or hydraulically to displace the bearing axially so that it acts via its rotating race on the diaphragm of a clutch and thus operates it.

The invention relates more specifically to clutch bearings in which a self-alignment elastic member is arranged between the non-rotating race of the clutch thrust rolling bearing and the operating member supporting the said thrust bearing.

French document No. 2 755 487 is known and describes a clutch bearing comprising a rolling bearing equipped with a rotating race and with a non-rotating race and mounted on an operating member equipped with a cylindrical part and with a radial flange against which the non-rotating race of the bearing bears, a member for elastic self-alignment of the non-rotating race with respect to the operating member being arranged around the cylindrical part of the operating member and in axial contact with the non-rotating race. The elastic self-alignment member comprises a means of bearing axially against the non-rotating race and a means of axial and radial securing to the cylindrical part of the operating member, the said bearing and securing means being separate from one another. The self-alignment member comprises a radial portion in which there are axially flexible elastic tabs bearing against a radial portion of the non-rotating race, and a ring of catching tabs extending inwards from the radial portion and axially on the opposite side to the elastic tabs. In the mounted state, the catching tabs exert, on the cylindrical part of the operating member, an inwardly-directed radial force which, through a bracing effect, prevents any axial movement of the self-alignment member away from the non-rotating race.

As a certain radial clearance remains between the bore of the non-rotating race of the bearing and the operating element, the thrust bearing can self-align with respect to the clutch diaphragm if the axes of these two parts are not initially coincident, self-alignment then being maintained through axial frictional contact of the radial surfaces of the non-rotating part and of the flange of the operating element, even if the thrust bearing is no longer in contact with the diaphragm or when contact is with a light preload.

While such a device is satisfactory in numerous instances, it can cause certain problems, particularly when very little space remains in the axial direction between the frontal radial parts of the rotating race and of the non-rotating race. What happens then is that it is no longer possible for the self-alignment element to be arranged, even partially, between the two races in the axial direction. Furthermore, it is not conceivable to produce a narrow passage or a rubbing seal in the radial direction, in that radial displacement between the rolling bearing and the operating element is possible.

The invention proposes to solve these problems.

The invention proposes a very compact self-centring device which furthermore provides excellent frontal sealing for the thrust rolling bearing, this sealing maintaining its entire effectiveness independently of the radial displacement of the rolling bearing with respect to the operating element when the bearing is self-centring.

The clutch bearing, according to one aspect of the invention, is a device of the type comprising an actuating element intended to be mounted on an operating element. The actuating element comprises a rolling bearing provided with a rotating race and with a non-rotating race, the said bearing being able to be displaced radially with respect to the operating element to self-align with the clutch diaphragm, the non-rotating race comprising an inwardly-directed radial portion. The device comprises a means of axially securing the actuating element to the operating element. The device comprises a self-alignment member centred on the non-rotating race and provided with axially elastic elements, so that the said self-alignment member exerts, on the means of axial securing and on the non-rotating race, axial forces in opposite directions and keeps the non-rotating race in permanent axial contact with a radial bearing surface of the operating element.

Advantageously, the self-alignment member is centred on the inwardly-directed radial portion of the non-rotating race.

Advantageously, the means of axial securing comprises a locking washer. The locking washer may comprise a roughly radial annulus and a number of tabs extending inwards and capable of catching on a surface of the operating element.

In one embodiment of the invention, the self-alignment member comprises a portion for centring on the non-rotating race, and a radial portion in which the elastic elements are formed.

In one embodiment of the invention, the centring portion is axial and push-fitted onto the non-rotating race.

In one embodiment of the invention, the self-alignment member comprises a sealing portion which may form a narrow passage with the rotating race. The narrow passage may have dimensions independent of the position of the actuating element on the operating element.

The rotating race may comprise an inwardly-directed radial portion, the self-alignment member being arranged radially inside the rotating race, particularly inside the radial portion of the rotating race.

In an alternative, the elastic elements rest against a roughly radial surface of the means of axial securing.

In another alternative, the elastic elements rest against the radial portion of the non-rotating race.

The clutch bearing actuating element, according to one aspect of the invention, is intended to be mounted on an operating element to form a clutch bearing device. The actuating element comprises a rolling bearing provided with a rotating race, with a non-rotating race and with a row of rolling elements, the said rolling bearing being designed to be able to be displaced radially with respect to the operating element so as to self-align with the diaphragm of the clutch. The non-rotating race comprises an inwardly-directed radial portion. The actuating element comprises a self-alignment member centred on the non-rotating race and provided with axially elastic elements, coming from a radial portion of the said self-alignment member, at least some of the said elastic elements in their free state projecting axially with respect to the said radial portion.

The self-alignment member may on its periphery comprise an axial portion directed in the opposite direction to the axial portion push-fitted onto the non-rotating race, that is to say towards the diaphragm. The peripheral axial portion faces the bore of the rotating race. As the two races of the rolling bearing are perfectly concentric, a narrow radial passage of very small size may be provided between the peripheral axial portion of the self-alignment member and the bore of the rotating race. This narrow passage always remains identical regardless of the radial displacement of the rolling bearing as it self-aligns on the diaphragm.

The self-alignment tabs rest axially against the radial surface of an immobilizing and resting element attached to the operating element and forming a means of axial securing. The opposite face of the radial portion of the non-rotating race to the one which is in contact with the radial portion of the self-alignment member is in contact with a radial surface of the operating element, for example with a radial surface of a flange extending outwards.

The locking washer provided in its central region with tabs which are slightly oblique with respect to a radial plane and slightly flexible in the axial direction may be introduced onto a cylindrical portion of the operating element and lock itself thereon through a bracing effect. The radial force exerted by the tabs of the self-alignment member on the locking washer therefore, by reaction, keeps the radial portion of the non-rotating race of the bearing pressed against the radial bearing surface of the operating element. Of course, any other means of axial securing could be envisaged, provided it comprises a roughly radial surface for collaborating with the tabs of the self-alignment member.

The present invention will be better understood and other advantages will become apparent from reading the detailed description of a number of embodiments taken by way of non-limiting examples and illustrated by the appended drawings, in which:

FIG. 1 is a view in axial section of a clutch bearing device according to one embodiment of the invention;

FIG. 2 is a detail view of FIG. 1;

FIG. 3 shows an alternative form of FIG. 2;

FIG. 4 is a front elevation of the self-alignment member of the device of FIG. 1;

FIG. 5 is a front elevation of the locking washer of the device of FIG. 1; and

FIG. 6 is an alternative form of FIG. 2.

As illustrated, the clutch bearing comprises a rolling bearing 1 mounted on an operating element 2 advantageously made of a synthetic material and which comprises a cylindrical body 3 and a radial bearing surface 4. The operating member 2 may for example be in the form of a piston of a hydraulic clutch-operating device or alternatively a separate push-rod axially extending the said piston. The operating element 2 is mounted on a stationary guide tube 5, while the said operating element 2 is able to be displaced in translation along the axis of the guide tube 5. An annular component 6 secured to the guide tube 5 radially surrounds the cylindrical body 3 of the operating element 2 and forms an exterior wall of an annular cylinder formed between the guide tube 5 and the component 6. A free end of the operating member 2 projects axially from the component 6 and comprises a cylindrical portion 7 the thickness of which is reduced by comparison to the cylindrical body 3 and provided with an exterior surface 8. The radial bearing surface 4 is arranged axially between the cylindrical body 3 and the cylindrical portion 8.

The rolling bearing 1 comprises a thin-walled non-rotating inner race 9 produced from pressing a metal sheet or a tube, and having a toric raceway 10 for a row of rolling elements 11 held by a cage 12. The inner race 9 also comprises an extension directed inwards in the form of a radial portion 13 and a cylindrical extension 14 on the opposite side to the radial portion 13.

The rolling bearing 1 is completed by a rotating outer race 15, which is also thin-walled and produced from pressing a metal sheet or a tube and which has a toric raceway 16 for the rolling elements 11, and a radial portion 17 which comes into contact with the surface of a diaphragm 18 of a clutch device to actuate the latter when the entirety of the thrust bearing supported by the operating element 2 is displaced axially. The rolling bearing 1 is protected on the opposite side to the diaphragm 18 by a sealing element 19 fixed to the outer race 15 and having a lip 20 coming into rubbing contact with the cylindrical extension 14 of the inner race 9.

The radial bearing surface may be extended radially towards the outside of the cylindrical body 3 by a radial flange of the operating element 2 which has a small radial dimension so that, while being in contact with the radial portion 13 of the inner race 9, it is radially surrounded by the said inner race 9 and lies roughly in the same radial plane as the rolling elements 11 or as the cage 12.

A member for elastic self-alignment of the non-rotating race 9 with respect to the operating member 2, referenced 21 in its entirety, is arranged around the cylindrical portion 7 of the operating element 2 and axially roughly in the region of the radial portion 13 of the inner race 9 and of the radial extension 17 of the outer race 15. The self-alignment member 21 is annular and comprises a radial portion 22 from which a number of elastic tabs 23, arranged in the circumferential direction, axially flexible and having a convex contacting surface, originate by cutting. By way of an alternative, it is possible to provide tabs which are axially elastic but oriented radially.

In the free state, the free end of the elastic tabs 23 projects axially with respect to the radial portion 22 of the self-alignment member.

The self-alignment member 21 comprises an axial portion 24 which extends at the periphery of the radial portion 22 towards the radial extension 17 of the outer race 15. It is possible to give the axial portion 24 dimensions such that it forms a narrow passage with the outer race 15, thus ensuring a good seal. Furthermore, the axial portion 24 contributes to the good rigidity of the radial portion 22. More specifically, the axial portion 24 extends axially across the entire thickness of the radial portion 17 of the outer race 15 as far as the plane of contact with the diaphragm 18, and does so with a small radial clearance between the bore of the radial portion 17 of the outer race 15 and the outer cylindrical surface 24a of the said axial portion 24.

The self-alignment member 21 further comprises an axial portion 25 connecting to the small-diameter end of the radial portion 22 and oriented in the opposite direction to the axial portion 24. The axial portion 25 fits into the circular bore of the radial portion 13 of the inner race 9 with tolerances that ensure good centring of the self-alignment member 21 with the inner race 9. It is possible to envisage the axial portion 25 being pushed-fitted as a slight interference fit into the bore of the said radial portion 14. Such push-fitting makes the inner race 9 associated with the self-alignment member 21 easier to handle without the risk of parts becoming lost.

The clutch bearing device is completed by a locking washer 26 forming a means of axial securing and comprising a radial annular part 27 and a number of tabs 28, in this instance eight tabs, starting from the interior edge of the annular part 27 and directed radially inwards and axially at a slight angle towards the diaphragm 18. The tabs 28 of the locking washer 26 are in contact with the outer cylindrical surface 8 of the cylindrical portion 7 and prevent any disassembly movement through a bracing effect. Thus, the radial portion 22 of the self-alignment member 21 is arranged axially between the locking washer 26 and the radial portion 13 of the non-rotating inner race 9.

The elastic tabs 23 of the self-alignment member 21 rest against the radial annular portion 27 of the locking washer 26 and thereon exert an axial force directed towards the diaphragm 18.

Thus, the radial portion 13 of the inner race 9 is in contact, on one side, with a radial bearing surface 4 of the operating element 2 and, on the other side, with the radial portion 22 of the self-alignment member 21. The tabs 23 starting from the said radial portion 22 project axially towards the diaphragm 18 and bear elastically against the locking washer 26. By reaction, the self-alignment member 21 therefore generates, on the radial portion 13 of the non-rotating race 9, an axial force directed towards the radial bearing surface 4 of the operating element 2, thus ensuring that the said non-rotating race 9 and the radial bearing surface 4 of the operating element 2 are kept constantly bearing axially against one another. This, through friction, allows the rolling bearing 1 to be kept in an appropriate radial position with respect to the operating element 2, this position being obtained when the rolling bearing 1 is self-centred with respect to the clutch diaphragm 18.

Furthermore, the clutch bearing device comprises a coil spring 29, a boot 30 made of flexible material and an interface 31 made of synthetic material and which is fixed to the axial extension 14 of the inner race 9, receiving pressure from the coil spring 29 and supporting one of the ends of the boot 30, the other end of which may be fixed to a stationary element, thus protecting the clutch operating system from the ingress of contaminants.

It will be understood that since the elastic self-alignment member 21 is connected radially to the inner race 9 by the centring of the axial portion 25 of the said member 21 in the bore of the said race 9, the narrow passage that there is radially between the bore of the rotating outer race 15 and the axial portion 24 of the self-alignment member 21 always keeps the same size, even during the radial displacement of the rolling bearing 1 with respect to the operating element 2, for example when the rolling bearing 1 is self-centring on the diaphragm 18.

By way of an alternative, the inner race may be a rotating race and the outer race may be a non-rotating race.

FIG. 3 illustrates an alternative form in which the self-alignment member 21 further comprises a sealing lip 32 overmoulded onto the outer cylindrical surface 24a of the axial portion 24 axially between the radial portion 13 of the inner race 9 and the radial portion 17 of the outer race 15, to improve the sealing between the said inner race 9 and outer race 15. Here, sealing is ensured by the narrow passage discussed earlier with reference to FIGS. 1 and 2 and by the sealing lip 32.

As the elastic self-alignment member 21 is secured both axially and radially to the inner race 9, sealing is ensured reliably and durably by the axial portion 24 and by the sealing lip 32 regardless of the radial movement of the bearing 1 with respect to the operating element 2. The rolling bearing 1 is able to be displaced radially with respect to the operating element 2, the tabs 23 of the self-alignment member 21 sliding radially with respect to the radial portion 27 of the locking washer 26 and the radial portion 13 of the inner race 9 sliding radially against the radial bearing surface 4 of the operating element 2. Any axial force exerted on the locking washer 26 in the opposite direction to the radial flange 4 tends to cause the catching tabs 28 of the said locking washer 26 to brace between the radial portion 27 and the cylindrical surface 8 of the operating element 2. The axial forces exerted by the tabs 23 of the self-alignment member 21 are therefore reacted in full by the radial portion 27 of the locking washer 26.

The catching tabs 28 are relatively rigid and not very deformable by comparison with the elastic tabs 23. This then avoids interaction between the catching tabs 28 and the elastic tabs 23. In other words, there is decoupling between the axial retaining function provided by the locking washer 26 and the frictional self-alignment function provided by the self-alignment member 21 equipped with its axially elastic tabs 23.

The decoupling of the functions makes it possible to use a relatively thick and rigid locking washer 26 which can thus offer a stable bearing surface with precise axial positioning on the operating element. Control over the axial position of the locking washer 26 with respect to the operating element 2 therefore makes it possible to determine precisely the preload exerted by the elastic tabs 23, given the thickness of the radial portion 13 of the inner race 9 and the thickness of the radial portion 22 of the self-alignment member 21.

FIG. 6 illustrates an alternative form in which the radial portion 22 of the self-alignment member 21 is in contact with the radial portion 27 of the locking washer 26. The tabs 23 are directed axially, away from the locking washer 26, towards the radial portion 13 of the non-rotating race 9 on which they exert an axial force which tends to keep it in contact with the radial surface 4 of the operating element 2.

The self-alignment member 21 needs to be centred in the bore of the radial portion 13 of the non-rotating race 9, but must not be mounted tightly in the said bore so as not to impede the freedom of relative axial displacement of these two elements. The elastic tabs 23 of the self-alignment member 21 thus, on the one hand, keep the radial portion 13 of the non-rotating race 9 of the bearing constantly and controllably bearing axially against the radial bearing surface 4 and, on the other hand, keep the radial portion 22 of the self-alignment member 21 bearing axially against the radial annular part 27 of the locking washer 26.

By virtue of the invention, a very compact self-centring device is obtained which furthermore provides excellent frontal sealing for the thrust rolling bearing. This sealing maintains its effectiveness over time regardless of the radial displacement of the rolling bearing with respect to the operating member while the rolling bearing is self-centring.

What is claimed is:

1. Clutch bearing device comprising:
    an actuating element intended to be mounted on an operating element, the actuating element comprising a rolling bearing provided with a rotating race and a non-rotating race, said bearing being able to be displaced radially with respect to the operating element to self-align with a clutch diaphragm, the non-rotating race comprising an inwardly-directed radial portion,
    a means of axially securing the actuating element to the operating element, and
    a self-alignment member centred on the non-rotating raced and provided with axially elastic elements, so that said self-alignment member exerts, on the means of axial securing and on the non-rotating race, axial forces in opposite directions and keeps the non-rotating race in permanent axial contact with a radial bearing surface of the operating element.

2. Device according to claim 1, wherein the self-alignment member is centred on the inwardly-directed radial portion of the non-rotating race.

3. Device according to claim 1, wherein the means of axial securing comprises a locking washer.

4. Device according to claim 3, wherein the locking washer comprises a roughly radial annulus and a number of tabs extending inwards and capable of catching on a surface of the operating element.

5. Device according to claim 1, wherein the self-alignment member comprises a portion for centring on the non-rotating race, and a radial portion in which the elastic elements are formed.

6. Device according to claim 5, wherein the centring portion is axial and push-fitted into the non-rotating race.

7. Device according to claim 1, wherein the self-alignment member comprises a sealing portion.

8. Device according to claim 7, wherein said sealing portion forms a narrow passage with the rotating race, said narrow passage having dimensions independent of the position of the actuating element on the operating element.

9. Device according to claim 7 wherein said sealing portion includes an axial portion extending in an axial direction.

10. Device according to claim 9 further comprising a sealing lip positioned to seal a space between said rotating and non-rotating race.

11. Device according to claim 1, wherein the elastic elements rest against a roughly radial surface of the means of axial securing.

12. Device according to claim 1 wherein said self-alignment member further comprises a sealing lip positioned so as to seal a space between said rotating race and non-rotating race.

13. Device according to claim 1, wherein the elastic elements rest against the radial portion of the non-rotating race.

14. Actuating element intended to be mounted on an operating element to form a clutch bearing device, the actuating member comprising:

a rolling bearing provided with a rotating race, a non-rotating race and a row of rolling elements, said rolling bearing being designed to be able to be displaced radially with respect to the operating element so as to self-align with a diaphragm of the clutch, the non-rotating race comprising an inwardly-directed radial portion, and a self-alignment member centred on the non-rotating raced and provided with axially elastic elements, coming from a radial portion of said self-alignment member, at least some of the elastic elements when in a free state projecting axially with respect to said radial portion.

* * * * *